Patented Aug. 15, 1933

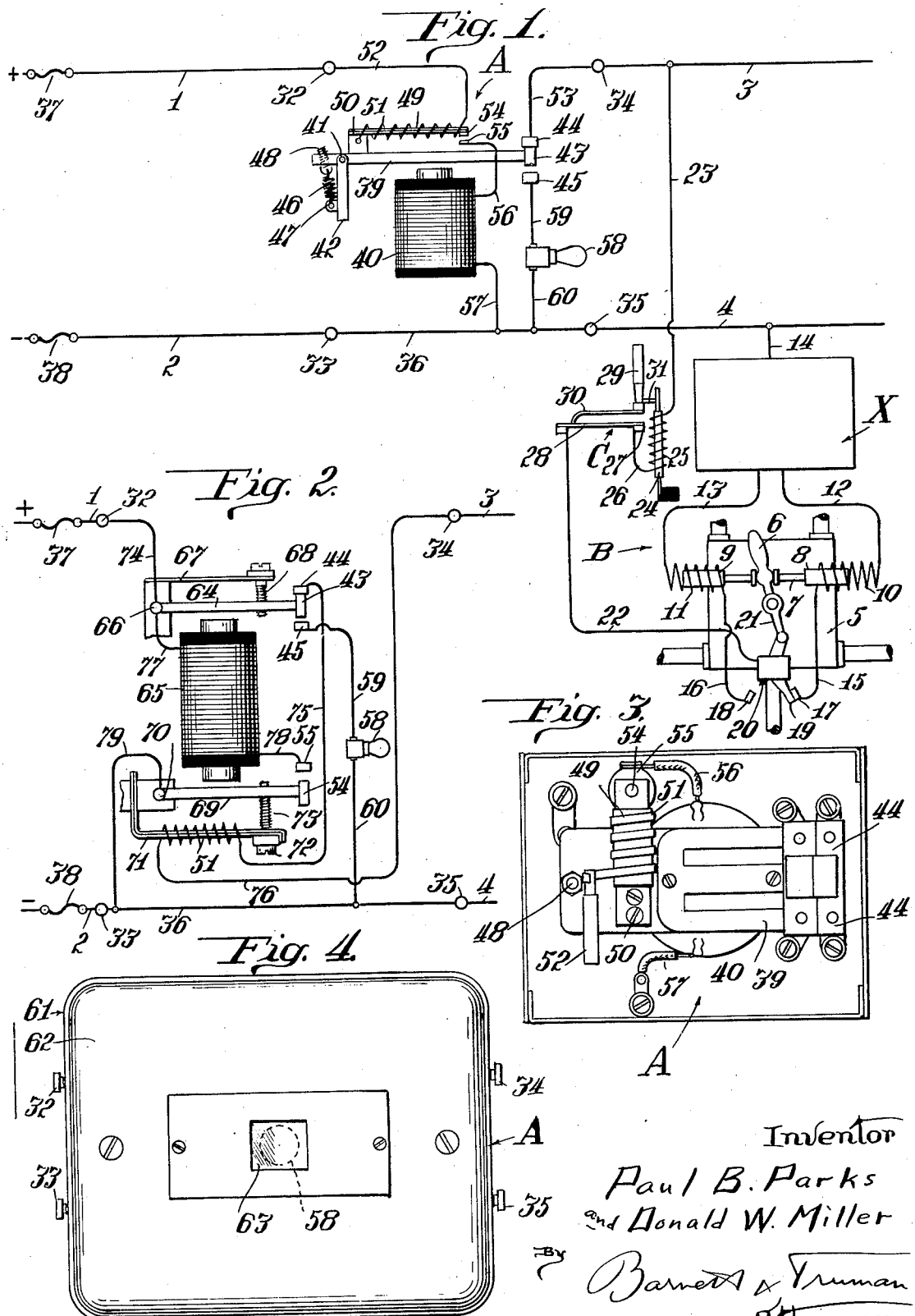

1,922,452

UNITED STATES PATENT OFFICE 1,922,452

AUTOMATIC RECLOSING CIRCUIT BREAKER
AND INDICATOR

Paul B. Parks, Oak Park, and Donald W. Miller,
Elmhurst, Ill., assignors to Vapor Car Heating Company, Inc., Chicago, Ill., a Corporation
of New York Application May 5, 1932. Serial No. 609,436

11 Claims. (Cl. 175—294)

This invention relates to certain new and useful improvements in circuit breakers, and more particularly to an automatically operating circuit breaker which will reclose after being open a certain interval of time and will then remain closed in case the condition causing the excessive current in the circuit has ceased, or which will again immediately open in case the abnormal condition still persists.

As is well known, the flow of an abnormal current in an electric circuit, caused by an overload or a short circuit may cause damage to the electrical apparatus in the circuit, and to prevent this fuses or automatic circuit breakers are provided in the circuit for breaking or interrupting the circuit in case such an abnormally heavy current is present. A fuse will burn out and must be replaced before the circuit can be re-established. Most circuit breakers are of the type which must be manually re-set before the circuit can be re-establshed. Sometimes the abnormal condition is fleeting, and the circuit can be safely re-established after a short interval of time, and the circuit breaker which forms the subject matter of this invention is of a type which automatically re-establishes the circuit after a short interval and which maintains the circuit closed thereafter in case the abnormal condition has passed. If not, the circuit is again interrupted and re-established periodically until the current flow is reduced to such a value that the circuit breaker can remain closed.

Briefly described, the circuit breaker comprises a main switch which is normally held closed by an adjustable spring mechanism. A second, normally open control switch is actuated by a thermal element consisting of a bi-metallic thermostatic bar surrounded by a heating coil connected in the main circuit. Heat developed in this coil by an abnormally large current flowing in the circuit will cause the bi-metallic bar to flex and close the control switch thereby establishing an auxiliary circuit through an electro-magnetic device which opens the main switch against the action of the spring which normally tends to hold this switch closed. The main switch will be held open as long as the control switch is closed. The electro-magnetic mechanism also tends to hold the control switch closed, thus resisting the action of the bi-metallic thermostatic bar which tends to open this control switch as the bar cools off. Consequently the opening of the control switch will be delayed so as to maintain the main circuit open for a more or less pre-determined length of time. A second auxiliary circuit through a signal device, for example an electric lamp, is completed by the main switch when moved to so-called "open" position, this signal indicating that the main circuit has been interrupted.

The principal object of this invention is to provide an improved automatic reclosing circuit breaker of the type briefly described hereinabove and disclosed more in detail in the specifications which follow.

Another object is to provide an improved reclosing circuit breaker provided with electro-magnetic means for opening the circuit and delaying the closing of the circuit.

Another object is to provide an improved automatic circuit breaker provided with a signal device for indicating the operating condition of the circuit breaker.

Other objects and advantages of this invention will be more apparent from the following detailed description of certain approved forms of apparatus constructed according to the principles of this invention.

In the accompanying drawing:

Fig. 1 is a wiring diagram of a preferred form of the circuit breaker.

Fig. 2 is a similar wiring diagram showing a modification.

Fig. 3 is a diagrammatic plan view of a circuit-breaker of the type shown in Fig. 1.

Fig. 4 is a plan view of a housing in which the elements of the circuit-breaker are assembled.

Referring first to Fig. 1, the invention has been shown as used in a regulating apparatus for car heating systems, such as is shown for example in the patent to Paul B. Parks and Donald W. Miller, No. 1,729,748, granted October 1, 1929. The two power lines are indicated at 1 and 2, these power lines being continued at 3 and 4 beyond the improved circuit-breaker assembly which is indicated as an entirety at A. At B is indicated one unit of a regulating means for a car heating system such as is disclosed in the Parks and Miller patent hereinabove referred to. This unit is adapted to control the temperature in one compartment of a railway car, and it is to be understood that a series of separate units such as B may be connected in parallel across the two mains 3 and 4. At 5 is indicated the distributing valve for the steam or vapor heating system, this valve being moved to open or closed position by the control lever 6, one arm of which is engaged between a central yoke on the slide bar 7 carrying at its opposite ends the cores 8 and 9 of the solenoids 10 and 11 respectively. One terminal of each solenoid is connected through the wires 12 and 13 respectively with a thermostatic control mechanism indicated diagrammatically at X and disclosed in detail in the Parks and Miller patent hereinabove referred to. This control mechanism is connected through wire 14 with one of the circuit mains 4. The other terminals of the solenoids 10 and 11 are connected through wires 15 and 16 with a pair of fixed contacts 17 and 18 respectively which are alternatively engaged by the movable contact 19 of a reversing switch 20 which is operated by the other arm 21 of control lever 6. The operating circuits are completed by a wire 22 which leads from reversing switch 20 to a thermal circuit-breaker indicated generally at C from which a wire 23 leads to the other power main 3. The operation of this heat control unit B (which forms no essential part of the present invention and need not be here described in detail, but which is disclosed in the Parks and Miller patent hereinabove referred to) is such that the valve 5 will be closed when a certain maximum temperature has been established in the car compartment and will be opened when the temperature again falls to a certain minimum temperature. The circuit breaker C (which is also disclosed in detail in the above mentioned patent) is normally closed but is adapted to automatically open when an abnormal current flows through this control circuit of the unit B. This circuit breaker comprises a bi-metallic bar 24 which is surrounded by heating coil 25 one terminal of which is connected with the wire 23, and the other terminal of which is connected by wire 26 with a fixed contact 27. A spring contact 28, with which the wire 22 is connected, is normally held in engagement with the fixed contact 27 by a plunger 29 which bears against the spring 30 and is held in this position by a latch 31 carried at the free end of the bi-metallic bar 24. Prolonged passage of current through the circuit, or the passage of an unusually heavy current, will cause the coil 25 to heat the bar 24 so that it will warp and release the latch 31 so that the spring contact 28 will move out of engagement with fixed contact 27 and break the circuit. This circuit breaker must be re-set manually by again depressing the plunger 29 until it is engaged by the latch 31. All of this mechanism is heretofore known, and is here shown merely to illustrate one form of operating circuit which may be connected between or form a part of the main circuit lines 3 and 4 which are under the control of the improved circuit breaker A, now to be described.

The main power lines 1 and 2 are connected with the terminals 32 and 33 at one side of the circuit breaker A, and the mains 3 and 4 are connected with the terminals 34 and 35 at the other side of the circuit breaker. It will be understood that all of the wiring shown in Fig. 1 between the terminals 32 and 34, and 33 and 35, respectively, may be included within the circuit breaker assembly (as indicated in Fig. 4). The terminals 33 and 35 are directly connected by a wire 36 so that the main 4 forms in effect an extension of the power line 2. Fuses 37 and 38 may be positioned in the power lines 1 and 2 in advance of the circuit breaker A.

Within the circiut breaker A, a main switch lever 39, which forms the armature of an electro-magnet device 40, is pivoted at 41 to a fixed support 42 and carries at the free end of its longer arm a movable contact 43 which alternatively engages the two fixed contacts 44 and 45. A contractile spring indicated at 46 has one end 47 attached to the fixed member 42 and is connected by an adjusting screw 48 with the shorter arm of armature 39 so that the spring normally holds the movable contact 43 in engagement with the fixed contact 44, this being hereinafter referred to as the closed position of this main switch. A bi-metallic thermostatic element 49 is fixedly mounted at one end 50 on the armature 39, preferably adjacent the pivot 41, and is surrounded by a heating coil 51, one terminal of which is connected through wire 52 with the terminal 32, and the other end of which is connected to some portion of the metallic assembly consisting of bars 39 and 49. The fixed contact 44 is connected through wire 53 with the terminal 34. Under normal operating conditions the main operating circuit is completed from power line 1 through wire 52, coil 51, armature 39, movable contact 43, fixed contact 44, wire 53, and main wire 3, thence through the control circuit B or its equivalent and circuit-breaker C back to the main 4, then through wire 36 to the negative power line 2.

A normally open control switch comprises a movable contact 54 and a fixed contact 55, the movable contact being carried by the free end portion of the thermostatic bar 49. When the thermostatic bar 49 is in normal position, it holds the movable contact 54 out of engagement with fixed contact 55. When the coil 51 is heated by the passage of an abnormal current therethrough or by the passage of a normal current for an abnormally long time, the bar 49 will be warped downwardly so as to move the contact 54 into engagement with the fixed contact 55. It will also be apparent that as the thermostatic element 48 cools off it will tend to return to its original position thus lifting the contact 54 out of engagement with contact 55. The fixed contact 55 is connected through wire 56 with one terminal of electro-magnet 40, the other terminal of this magnet being connected through wire 57 with wire 36 and thence with power line 2. At 58 is indicated a signal light, one terminal of which is connected by wire 59 with the fixed contact 45 of the main switch, and the other terminal being connected by wire 60 with the wire 36 leading to power line 2. It will be apparent that any other suitable form of electrically operated signal device, either visible or audible, could be substituted for the signal light 58.

In normal operation the main circuit will be maintained between power lines 1 and 2 and the mains 3 and 4 through circuit breaker A, as hereinabove specified. At such time the auxiliary circuits through the electro-magnet 40 and through the signal light 58 will be open since the contact 54 of the control switch is not in engagement with fixed contact 55, and the movable contact 43 of the main switch is out of engagement with the fixed contact 45. In case an unusually heavy current flows between the mains 3 and 4, or this current flow is protracted for an unusual length of time, the heating coil 51 will cause the thermostatic element 49 to warp downwardly and move the contact 54 of the control switch into engagement with fixed contact 55, thus closing an auxiliary circuit between the power lines 1 and 2 as follows: From power line 1 through wire 52, coil 51, thermostatic bar 49, movable contact 54, fixed contact 55, wire 56, electro-magnet 40, and wires 57 and 36 to the power line 2. The electro-magnet 40 will be energized and will pull down the armature 39 against the resistance of spring 46 thus breaking the main circuit between wires 3 and 4. At the same time, the movable contact 43 will be brought into engagement with fixed contact 45 thus completing a second auxiliary circuit through the signal light 58 which will be illuminated to give a visible signal that the main circuit has been broken. The thermostatic bar 49 is so positioned on the armature 39 that the movement of this armature toward the magnet 40 will additionally force the contact 54 against the fixed contact 55 with a wiping action which is desirable to properly maintain the contact surfaces. While the thermostatic bar 49 has been shown in Fig. 1 positioned parallel with the armature bar 39, so as to facilitate the diagrammatic showing, it will preferably be positioned at right-angles to the bar 39 as shown in Fig. 3. This will decrease the magnitude of the downward movement of the contact 54 caused by movement of bar 39 and will improve the wiping engagement of contacts 54 and 55. It will be apparent that the force exerted by the magnet in holding contacts 54 and 55 in engagement can be varied as desired by positioning the fixed end 50 of the thermostatic bar closer or further from the pivotal axis of bar 39.

When the main circuit has been broken by the energization of magnet 40 and the separation of contacts 44 and 43, the coil 51 will begin to cool off and straighten out since the reduced current flowing through magnet coil 40 is now all that passes through the heating coil and this current is insufficient to materially heat the coil 51. The pull of magnet 40 which tends to hold the contacts 54 and 55 in engagement will delay the separation of these contacts as the thermostatic element cools off, but when the lifting force exerted by the thermostatic element becomes sufficient the control switch will snap open and the consequent deenergization of magnet 40 will permit the bar 39 to be raised by spring 46. The pull of magnet 40 when energized, exerted through bars 39 and 49, tends to secure a better and more permanent engagement of contacts 54 and 55 and prevents chattering of this control switch. When the auxiliary circuit through the electro-magnet is broken, spring 46 will at once close the main switch thus re-establishing the main circuit through wires 3 and 4 and the units connected therewith. At the same time the circuit through signal light 58 will be broken so that this light will be extinguished to indicate that the main circuit has again been closed. If the conditions are now such that current no longer flows through the main circuit, or the strength of this current has been reduced to a safe maximum, the heating coil 51 will not again immediately operate to close the control switch and the circuit breaker will remain in normal closed position as indicated in Fig. 1. However, if the abnormal condition still prevails, the thermostatic element will be again heated so as to close the control switch and thus open the main switch and the action of the circuit breaker will be repeated as hereinabove described. The automatic circuit breaker A will thus operate repeatedly and periodically to open and close the main circuit as long as the abnormal condition persists in that circuit.

In an installation such as indicated in Fig. 1, each unit B of the heat control system will be provided with its own circuit breaker C, but the main circuit breaker A will be set to operate before the circuit breakers C are caused to function. In case of an excessive or prolonged current flow occurs in any one of the units B (or in any other part of the main circuit fed from the wires 3 and 4) the circuit breaker A will function to temporarily open the circuit. If the condition persists, or is serious enough to cause possible injury to the electrical apparatus, the circuit breaker C in the particular unit B where the trouble occurs will open, thus throwing that particular unit out of service until the condition has been remedied and the circuit breaker C has been manually reset. The circuit breaker A will automatically reclose so that the remainder of the system will continue to function. In case of a failure of any or all of the circuit breakers to properly function, the fuses 37 and 38 will burn out in the usual manner.

All of the elements of the circuit breaker A may be mounted in a housing 61, as indicated in Fig. 3, this housing being provided with a removable closure 62 provided with a window 63 through which the signal light 58 is visible. The light bulb or the window 58 may be colored (for example red) so as to give the desired signal when the circuit is broken.

In Fig. 2 is indicated diagrammatically a modified form of the circuit-breaker in which the main switch and the control switch for the electro-magnet are independently mounted. The main armature 64 of magnet 65 is pivoted at 66 to a fixed member and the spring 67, connected with the armature through adjusting screw 68, normally holds the movable contact 43 (carried by armature 64) in engagement with fixed contact 44. A second armature 69 pivoted to a fixed member at 70, carries the movable contact 54 of the control switch. The free end of the thermostatic element 71 is perforated to receive the screw 72 mounted in armature 69, a spring 73 surrounding the screw being confined between the armature and thermostatic bar. The heating coil 51 is wound about the thermostatic bar 71. The main circuit extends from positive main 1 through wire 74, armature 64, movable contact 43, fixed contact 44, wire 75, coil 51, and wire 76 to main 3, thence as before back to the negative main 2. When the thermostatic bar 71 is heated and warped it will swing armature 69 to close the control switch at 54 and 55. The auxiliary circuit for energizing magnet 65 extends from positive main 1 through wires 74 and 77, magnet 65, wire 78, fixed contact 55, movable contact 54, armature 69 and wire 79 to the negative main 2. The electro-magnet 65 is so wound that it exerts a powerful pull on armature 64 sufficient to overcome the spring 67 and hold the main switch open by moving contact 43 out of engagement with fixed contact 44 and into engagement with fixed contact 45. This completes the energizing circuit for signal light 58 as in the first described form of the invention. The magnet exerts a less powerful pull on armature 69 so as to merely resist the opening of the control switch and to hold the contacts 54 and 55 in engagement and prevent chattering of the switch until the thermostatic bar 71 has cooled sufficiently to snap the switch open against the resistance of the magnetic pull on armature 69, thus deenergizing the magnet. The main switch will then be closed by spring 67 and the circuit of signal light 58 will be opened. It will be understood that instead of using a single magnet 65, a pair of separate magnets could be used, connected in series, and acting separately on the armatures 64 and 69.

It will be understood that the wiring hook-ups could be varied considerably from those herein shown by way of illustration without departing from the principles of this invention.

We claim:

1. An automatically reclosing circuit breaker comprising a circuit-breaker element, means for normally holding this element in circuit-closing position, electro-magnetic means for moving the element to circuit-breaking position, and means comprising a normally open circuit-means for energizing the electro-magnetic closure including the thermostatic means responsive to an abnormal current for moving the circuit closure to closed position, said electro-magnetic means also functioning to resist opening movement of the circuit-closure.

2. An automatically reclosing circuit-breaker comprising a switch in the main circuit, yieldable means for normally holding the switch closed, electro-magnetic means for opening the switch, an energizing circuit for the electro-magnetic means, a normally open control switch in the energizing circuit, thermostatically operated means actuated by an abnormal current in the main circuit for closing the control switch, said electro-magnetic means also functioning to hold the control switch closed.

3. An automatically reclosing circuit-breaker comprising a signal device, a signal energizing circuit, a main switch adapted in one position to close the main circuit and open the signal circuit, and in another position to open the main circuit and close the signal circuit, yieldable means for normally holding the switch in position to close the main circuit, an electro-magnetic device for moving the main switch to open the main circuit and close the signal circuit, an energizing circuit for the electro-magnetic means, a normally open control switch in the last mentioned circuit, thermostatically operated means actuated by an abnormal current in the main circuit for closing the control switch, said electro-magnetic means also functioning to hold the control switch closed.

4. An automatic reclosing circuit-breaker adapted to be interposed between a pair of power lines and a main circuit to be controlled, comprising a self-closing switch in the main circuit, a thermostatic element comprising a heating coil in the main circuit, an auxiliary circuit between the power-lines, a normally open switch in the auxiliary circuit which is closed by the thermostatic element in response to an abnormal current in the main circuit, and electro-magnetic means in the auxiliary circuit functioning when energized to open and hold open the self-closing switch, and to resist opening of the thermally controlled switch.

5. An automatic reclosing circuit-breaker adapted to be interposed between a pair of power lines and a main circuit to be controlled, comprising a self-closing switch in the main circuit, a thermostatic element comprising a heating coil in the main circuit, an auxiliary circuit between the power-lines, a normally open switch in the auxiliary circuit which is closed by the thermostatic element in response to an abnormal current in the main circuit, and an electro-magnet in the auxiliary circuit functioning when energized to open and hold open the self-closing switch and to simultaneously impart additional closing movement to the thermally controlled switch.

6. An automatic reclosing circuit-breaker adapted to be interposed between a pair of power lines and a main circuit to be controlled, comprising a main switch including a movable armature member and two spaced contacts which the movable member alternatively engages, one of the power lines being connected with the movable switch member and one side of the main circuit being connected with the first of the spaced contacts, the other side of the main circuit being connected with the other power line, yieldable means for normally maintaining the movable switch member in engagement with the first fixed contact to close the main circuit, an electrically operated indictator, an indicator-energizing circuit connected between the second fixed contact and the second power line, electro-magnetic means functioning when energized to move the movable switch member out of engagement with the first fixed contact and into engagement with the second fixed contact, an auxiliary circuit between the power lines for energizing the electro-magnetic means, a normally open thermally controlled switch in said auxiliary circuit, and a thermal element in the main circuit which functions to close the last mentioned switch when an abnormal current flows in the main circuit, the electro-magnetic means also functioning to assist in holding the thermally controlled switch in closed position.

7. An automatically reclosing circuit-breaker comprising a normally closed switch and a normally open switch, a thermostatic element connected to hold the normally open switch in open position but adapted to close this switch when the element is heated to a predetermined temperature, a heating coil for the element, wiring connections for including the normally closed switch and the coil in the main circuit to be controlled, a spring connected to normally hold the first mentioned switch in closed position, each of the switches comprising a movable member, an electro-magnetic device adapted when energized to move the movable element of the first mentioned switch against the resistance of the spring to open the main circuit and to simultaneously impart additional closing movement to the movable element of the normally open switch, and an energizing circuit for the electro-magnetic device which is controlled by the normally open switch.

8. An automatically reclosing circuit-breaker comprising an electro-magnetic device, a movable armature therefor, a main circuit-breaking switch comprising a fixed contact and a contact carried by the movable armature, a thermostatic bar mounted on said movable armature, a control switch comprising a fixed contact and a movable contact carried by the free end portion of the thermostatic bar, a heating coil associated with the thermostatic bar and included in the main circuit, an energizing circuit for the electro-magnetic device, said circuit including the control switch, the thermostatic bar functioning when heated to close the control switch, a spring for normally moving the armature to a posiclosed, the electro-magnet functioning when energized to move the armature against the resistance to the spring to open the circuit-breaker, the thermostatic bar being so positioned on the armature that movement of the armature to open the circuit breaker will impart additional closing movement to the control switch.

9. An automatically reclosing circuit-breaker comprising an electro-magnetic device, a movable armature therefor, a main circuit-breaking switch comprising a fixed contact and a contact carried by the movable armature, a thermostatic bar mounted on said movable armature, a control switch comprising a fixed contact and a movable contact carried by the free end portion of the thermostatic bar, a heating coil associated with the thermostatic bar and included in the main circuit, an energizing circuit for the electro-magnetic device said circuit including the control switch, the thermostatic bar functioning when heated to close the control switch, a spring for normally moving the armature to a position for holding the circuit-breaking switch closed, the electro-magnet functioning when energized to move the armature against the resistance of the spring to open the circuit-breaker, the thermostatic bar being so positioned on the armature that movement of the armature to open the circuit breaker will give a wiping movement to the contacts of the control switch and tend to hold this switch in closed position.

10. An automatically reclosing circuit-breaker comprising an electro-magnetic device, a movable armature therefor, a main circuit-breaking switch comprising a fixed contact and a contact carried by the movable armature, a thermostatic bar mounted on said movable armature, a control switch comprising a fixed contact and a movable contact carried by the free end portion of the thermostatic bar, a heating coil associated with the thermostatic bar and included in the main circuit, an energizing circuit for the electro-magnetic device said circuit including the control switch, the thermostatic bar functioning when heated to close the control switch, an electrically operated signal, an energizing circuit for the signal comprising a fixed contact member cooperating with the movable contact on the armature, a spring for normally moving the armature to a position for closing the circuit-breaking switch and opening the energizing circuit for the signal, the electro-magnet functioning when energized to move the armature against the resistance of the spring to open the circuit breaker and close the signal circuit, the thermostatic bar being so mounted on the armature that movement of the armature to open the circuit breaker will impart additional closing movement to the control switch.

11. An automatically reclosing circuit-breaker comprising an electro-magnetic device, a movable armature therefor, a main circuit-breaking switch comprising a fixed contact and a contact carried by the movable armature, a thermostatic bar mounted on said movable armature, a control switch comprising a fixed contact and a movable contact carried by the free end portion of the thermostatic bar, a heating coil associated with the thermostatic bar and included in the main circuit, an energizing circuit for the electro-magnetic device said circuit including the control switch, the thermostatic bar functioning when heated to close the control switch, an electrically operated signal, an energizing circuit for the signal comprising a fixed contact member cooperating with the movable contact on the armature, a spring for normally moving the armature to a position for closing the circuit-breaking switch and opening the energizing circuit for the signal, the electro-magnet functioning when energized to move the armature against the resistance of the spring to open the circuit-breaker and close the signal circuit, the thermostatic bar being so mounted on the armature that movement of the armature to open the circuit breaker will give a wiping movement to the contacts for the control switch and tend to hold this switch in closed position.

PAUL B. PARKS.
DONALD W. MILLER.

---

CERTIFICATE OF CORRECTION.

Patent No. 1,922,452.            August 15, 1933.

PAUL B PARKS, ET AL.

It is hereby certified that error appears in the printed specification of the above numbered patent requiring correction as follows: Page 4, line 21, claim 1, strike out the words "means for energizing the electro-magnet" and insert the same before "means" in line 20; after line 150, claim 8, insert the syllable and words "tion for holding the circuit-breaking switch"; and that the said Letters Patent should be read with these corrections therein that the same may conform to the record of the case in the Patent Office.

Signed and sealed this 19th day of September, A. D. 1933.

M. J. Moore.

(Seal)                                        Acting Commissioner of Patents.